(12) United States Patent
Giarrusso

(10) Patent No.: US 8,235,419 B1
(45) Date of Patent: Aug. 7, 2012

(54) LATERAL STABILITY SYSTEM FOR A VEHICLE

(76) Inventor: Peter Anthony Giarrusso, Winter Springs, FL (US)

( * ) Notice: Subject to any disclaimer, the term of this patent is extended or adjusted under 35 U.S.C. 154(b) by 125 days.

(21) Appl. No.: 12/798,702

(22) Filed: Apr. 9, 2010

Related U.S. Application Data

(60) Provisional application No. 61/212,406, filed on Apr. 10, 2009.

(51) Int. Cl.
*B60K 28/14* (2006.01)
(52) U.S. Cl. ............. 280/755; 280/763.1; 280/767; 280/296; 280/301
(58) Field of Classification Search ............ 280/293, 280/296, 295, 301–304, 124.111, 124.128, 280/755, 763.1, 767; 180/219; 16/44, 32, 16/34, 18 R, 29; 301/5.21
See application file for complete search history.

(56) References Cited

U.S. PATENT DOCUMENTS

| | | | |
|---|---|---|---|
| 2,051,627 A * | 8/1936 | Weinmann | 16/18 R |
| 2,472,686 A * | 6/1949 | Snyder | 16/44 |
| 4,203,500 A * | 5/1980 | Kamiya | 180/219 |
| 4,485,521 A * | 12/1984 | Welsch et al. | 16/44 |
| 4,595,213 A * | 6/1986 | Tsuchie | 280/293 |
| 5,029,894 A | 7/1991 | Willman | |
| 5,257,671 A | 11/1993 | Watkins | |
| 5,400,469 A | 3/1995 | Simonsen | |
| 5,467,838 A | 11/1995 | Wu | |
| 5,628,379 A | 5/1997 | Watkins | |
| 5,727,285 A | 3/1998 | Goman | |
| 5,816,354 A | 10/1998 | Watkins | |
| 5,904,218 A | 5/1999 | Watkins | |
| 5,944,131 A | 8/1999 | Schaffner et al. | |
| 6,022,037 A | 2/2000 | Code | |
| 6,213,237 B1 | 4/2001 | Willman | |
| 6,237,930 B1 | 5/2001 | Code | |
| 6,279,199 B1 | 8/2001 | Plate | |
| 6,349,246 B1 | 2/2002 | Smith et al. | |
| 6,357,077 B1 | 3/2002 | Jones, Jr. et al. | |
| 6,425,161 B1 | 7/2002 | LeMeur, Jr. et al. | |
| 6,460,641 B1 | 10/2002 | Kral | |
| 6,507,975 B2 | 1/2003 | Maupin et al. | |
| 6,533,306 B2 | 3/2003 | Watkins | |
| 6,543,798 B2 | 4/2003 | Schaffner et al. | |
| 6,685,208 B1 | 2/2004 | Cowie | |
| 6,705,632 B2 | 3/2004 | Yoshida | |
| 6,789,810 B2 | 9/2004 | Strong | |
| 6,811,454 B2 | 11/2004 | Royle | |
| 6,877,185 B2 | 4/2005 | Reilly et al. | |
| 7,006,901 B2 | 2/2006 | Wang | |
| 7,070,194 B2 | 7/2006 | Garland et al. | |
| 7,093,319 B2 | 8/2006 | Lemeur, Jr. et al. | |
| 7,287,774 B2 | 10/2007 | Mullins | |
| 7,396,033 B2 * | 7/2008 | Murata et al. | 280/293 |
| 7,451,994 B2 | 11/2008 | Heitner | |
| 7,914,033 B2 * | 3/2011 | Nethery | 280/293 |
| 2006/0288526 A1 * | 12/2006 | Larson | 16/44 |
| 2011/0006497 A1 * | 1/2011 | Chen et al. | 280/87.042 |

* cited by examiner

*Primary Examiner* — Drew Brown
(74) *Attorney, Agent, or Firm* — Norman A. Nixon

(57) ABSTRACT

A lateral stabilization system for a vehicle including a leg assembly attached to the vehicle, the leg assembly having a pair of spaced apart, substantially parallel legs extending rearwardly of a forward end of the vehicle, an articulating wheel assembly affixed to a distal end of each leg and a position control device that controls movement of the leg assembly in response to operating parameters of the vehicle. The articulating wheel assembly may be connected with the leg assembly so that it articulates in a first direction that is substantially parallel to the longitudinal axis of the vehicle and in a second direction that is substantially perpendicular to the first direction.

17 Claims, 4 Drawing Sheets

LATERAL STABILITY SYSTEM FOR A VEHICLE

CROSS REFERENCE TO RELATED APPLICATIONS

This application claims the priority to U.S. Provisional Application having Application No. 61/212,406 filed on Apr. 10, 2009 and which is incorporated herein by reference for the entirety of the disclosure contained therein.

FIELD OF THE INVENTION

The present invention relates to a lateral stability system for various vehicles including motorcycles. Specifically, the invention relates to a system that laterally stabilizes a motorcycle while not restricting the natural feel, operation and appearance of the motorcycle.

BACKGROUND OF THE INVENTION

A motorcycle naturally stabilizes when in motion due to the gyroscopic effects of the front and rear wheel rotation. This stabilizing effect is slight at low speeds, approximately below 10 mph and is non-existent when the motorcycle is stationary. A typical touring motorcycle such as various models of Harley-Davidson® and Honda® touring motorcycles weigh in excess of 650 lbs. and more particularly 800 to 950 lbs.

SUMMARY OF THE INVENTION

Embodiments of the present invention provide speed stability to a vehicle such as a motorcycle while maintaining its aesthetic beauty. Embodiments of the invention may be modified for use with any motorcycle model from various manufactures as well as other vehicle types where vehicle stabilization is desired.

One aspect of the invention is a motorcycle stabilization system including an attachment frame configured to fixedly attach to a structure of the motorcycle; a first member rotatably attached to the attachment frame such that the first member is rotatable about a first axis arranged substantially perpendicular to a longitudinal centerline of the motorcycle, the first member including a first leg and a second leg where the first and second legs extend rearwardly of a forward end of the motorcycle and are arranged at a distance from each other, and substantially perpendicular to the first axis, and substantially parallel to the longitudinal centerline of the motorcycle; an actuator arranged between the structure of the motorcycle and the first member where the actuator selectively determines a position of the first member; a pair of articulated second members, each of the articulated second members being rotatably arranged at respective distal ends of the first and second legs, wherein the pair of articulated second members each rotate about a second axis arranged a distance from and substantially parallel to the first axis; a pair of wheels, each wheel rotatably secured to a respective second member such that the pair of wheels operatively stabilize the motorcycle in a lateral direction.

The stabilization system may further allow the motorcycle to lean laterally up to a permissible amount without tipping over where the permissible amount is +/−10° from vertical when the motorcycle is stationary and +/−25° from vertical when the motorcycle is in motion. The stabilization system may further include a control system that automatically controls a position of the pair of wheels with respect to the ground based on a wheel speed of the motorcycle where the control system may include a user input device, a system display, a processor and a wheel speed sensor. Each of the pair of articulated second members may further rotate about respective axes arranged substantially parallel to the longitudinal centerline of the motorcycle and the stabilization system may be constructed and arranged to fit within a width envelope of the motorcycle.

BRIEF DESCRIPTION OF THE DRAWINGS

The invention is explained in the following description in view of the drawings that show.

DETAILED DESCRIPTION OF THE INVENTION

Embodiments of the present invention are disclosed in the context of a lateral stability system for a motorcycle but are not limited to use with a motorcycle. For example, embodiments of the inventive system could be used within the aerospace, transportation, manufacturing or healthcare industries or any other field where lateral stability of an inherently unstable vehicle or device is needed. One skilled in the art may find additional applications for embodiments of the inventive system disclosed herein.

Figure 1:
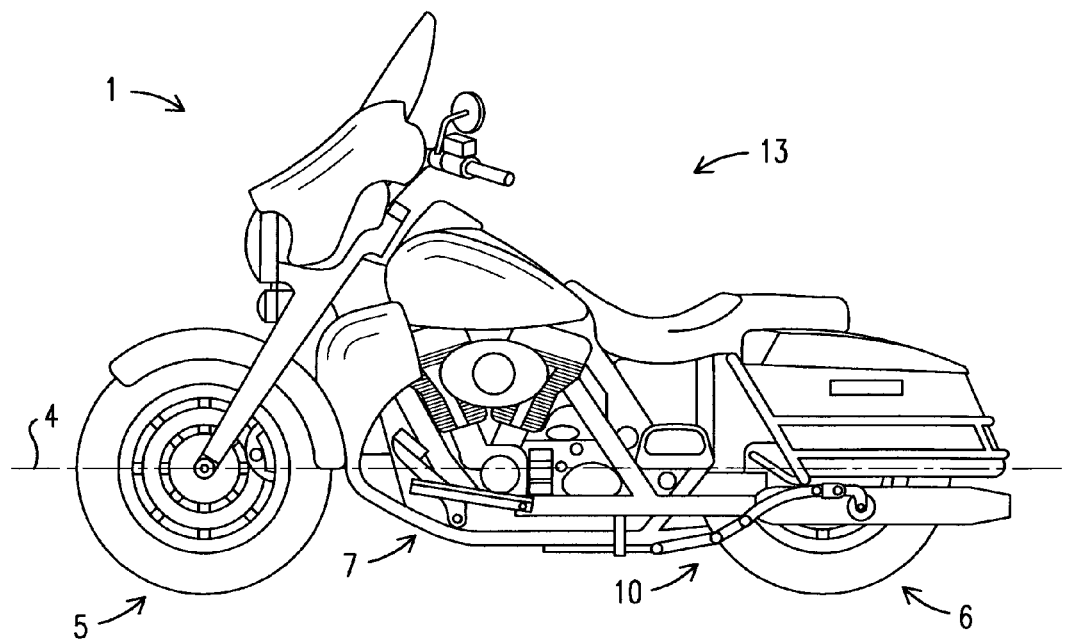
FIG. 1 is a side view of a motorcycle with an exemplary lateral stability system retracted or not deployed.

Referring to FIG. 1, a motorcycle 1, typically comprises a frame 7 and a front wheel assembly 5 arranged at a front end of the motorcycle and a rear wheel assembly 6 arranged at a rear end of the motorcycle 1. A longitudinal centerline 4 runs along the length of motorcycle 1 and divides the vehicle into a right and left half as viewed from above motorcycle 1. Embodiments of a lateral stability system 13, more clearly illustrated in FIG. 3, may include a leg and wheel assembly 10 and components controlling the rotational position of leg and wheel assembly 10.

Figure 2:
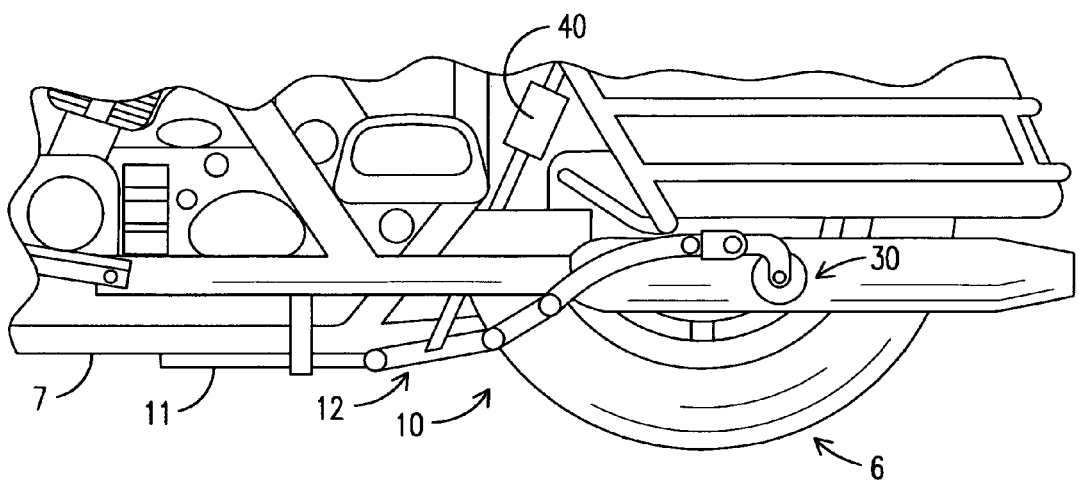
FIG. 2 is a closer view of the exemplary lateral stability system of FIG. 1.

FIG. 2 illustrates an embodiment of leg and wheel assembly 10 illustrated in FIG. 1 running laterally along one side of motorcycle 1. FIG. 2 illustrates an exemplary attachment arrangement of the leg and wheel assembly 10, more clearly illustrated in FIG. 4, to motorcycle frame 7. Embodiments of leg and wheel assembly 10 may be formed with attachment frame 11, first member 12 and one or more articulating wheel assemblies 30. The rotational position of leg and wheel assembly 10 may be controlled in response to an actuator 40, which may be attached between frame 7 and first member 12 or other appropriate locations for performing this function. Attachment frame 11 may assume various configurations provided it is capable of attaching leg and wheel assembly 10 to frame 7. Embodiments of the invention may be attached to motorcycle frame 7 or other support structures of the motorcycle by various attachment means such as a series of appropriately configured mounting brackets. For example, a commercially available Harley-Davidson® center stand may be used as the structural attachment points of leg and wheel assembly 10 to motorcycle frame 7.

Figure 3:
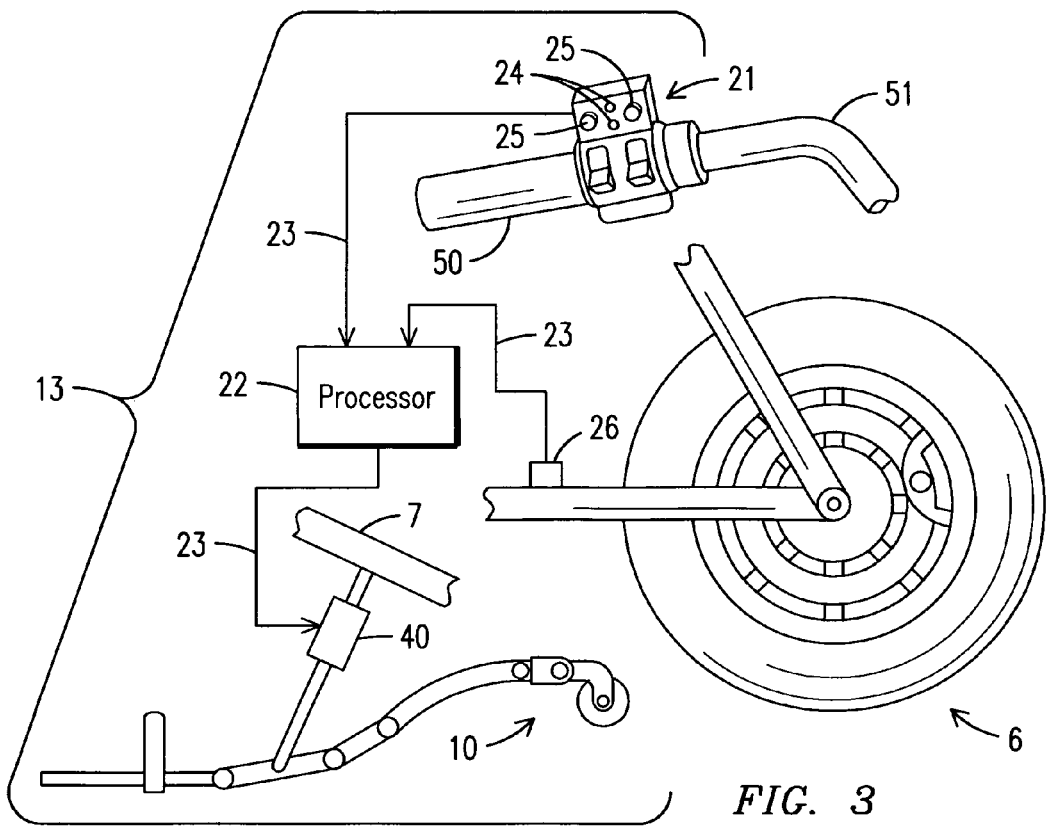
FIG. 3 is a detailed view of components of the exemplary lateral stability system of FIG. 1.
Figure 4:
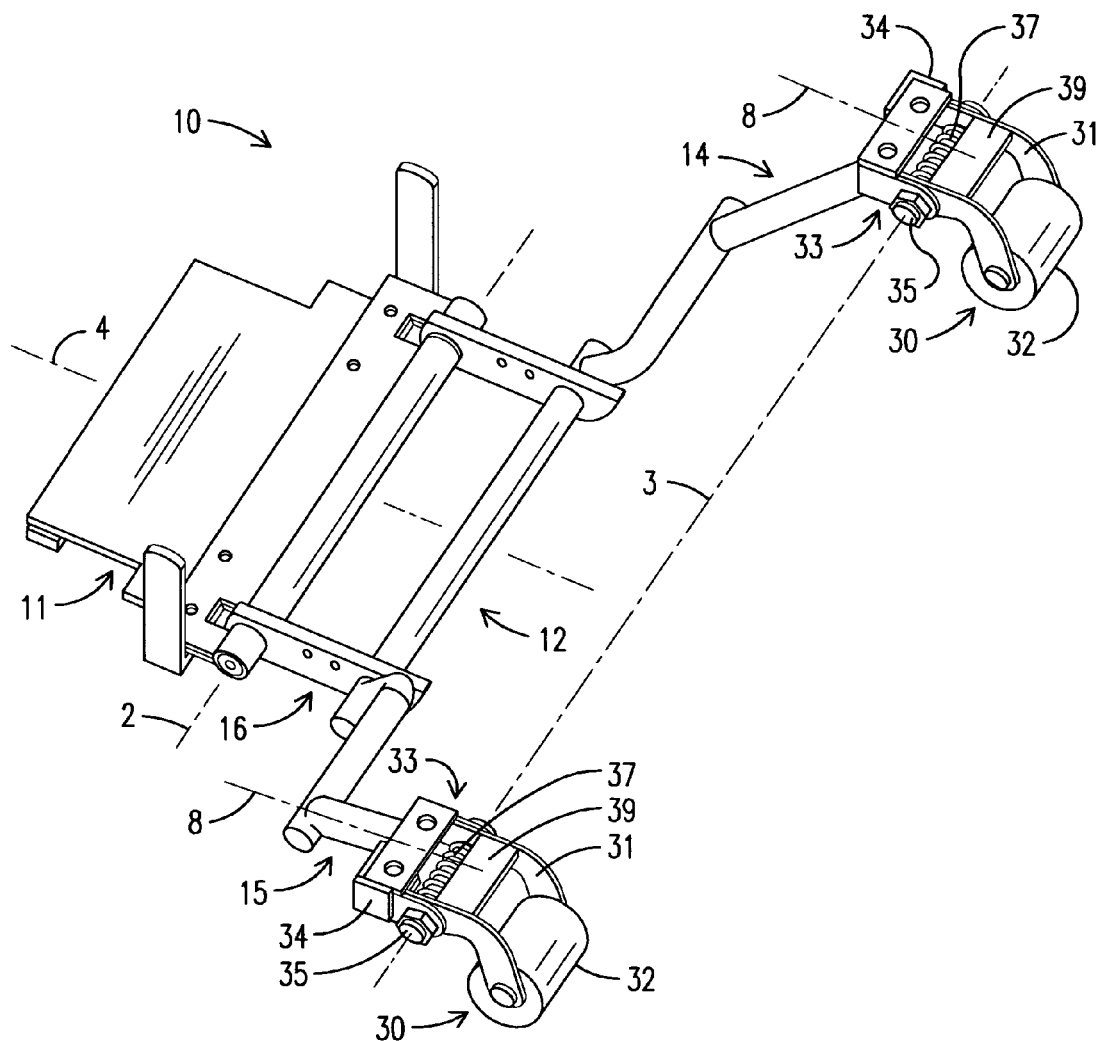
FIG. 4 is an isometric view of an exemplary attachment frame and an exemplary leg and wheel assembly.

As illustrated in FIGS. 2, 3 and 4, an actuator 40 may be utilized to control a rotational position of leg and wheel assembly 10 as leg and wheel assembly 10 rotates about a first axis 2. Actuator 40 may be attached to first member 12 at actuator attachment location 16 and to an appropriate mounting point on motorcycle frame 7 or other support structure so that actuator 40 may control motion of leg and wheel assembly 10. Actuator 40 may be attached to motorcycle frame 7 via a bracket fabricated and designed for the best leverage and clearance required for the specific vehicle.

Referring to FIG. 3, lateral stability system 13 may include leg and wheel assembly 10, an on-board processor 22, a user input/display device 21, actuator 40, a position sensor (not separately shown) that indicates the position of leg and wheel assembly 10, a rear wheel speed sensor 26 and communication links 23. An exemplary position sensor may be incorporated within the actuator 40. Processor 22 may be configured to receive position information from the actuator 40 and use this information to control up and down limits of the actuator 40 while simultaneously providing a position control signal to the actuator 40. Embodiments of lateral stability system 13 may be configured to operate via a twelve (12) volt power supply of the motorcycle 1. The user input/display device 21 may include at least one (1) and preferably two (2) momentary switches 25 as the user input device and at least one (1) and preferably two (2) indicator lamps 24 as the display device.

The user input/display device 21 may be arranged as a box mounted to either side of handlebars 51 adjacent to a hand grip 50. Varying numbers of switches 25 and lamps 24 may be used depending on the specific applications. Two (2) lamps 24 may be used to inform the user of the system status. Functions of lamps 24 may include indication of whether the power to lateral stability system 13 is on/off, positions of leg and wheel assembly 10 such as deployed, retracted or in between these positions, whether leg and wheel assembly 10 is moving, and whether a maintenance mode is activated.

The speed sensor 26 can be embodied as a Hall-sensor that may be mounted at the rear of the motorcycle (rear wheel attachment point), may detect rear wheel rotation and transmit data to processor 22 to determine speed as well as acceleration and deceleration of motorcycle 1. The input/display device 21, speed sensor 26, and actuator 40 may all communicate with processor 22 via respective communication links 23. Processor 22 may be connected directly to actuator 40 via communication link 23, or the processor 22 may control the actuator 40 via a relay device that receives a control signal of the processor 22 to trigger actuation of actuator 40.

Actuator 40 may be a twelve (12) volt linear electronic actuator energized by the electrical system of motorcycle 1. Actuator 40 may have built in stops at fully open and fully closed positions, as well as an in-built potentiometer to provide feedback to on-board processor 22, which allows for indicators 24 to be illuminated thereby indicating whether leg and wheel assembly 10 is deployed or retracted, or in an 'down' or 'up' position. However, the specific type of actuator 40 is not a limiting factor within the scope of the invention and one skilled in the art will readily appreciate that there are alternative ways to actuate embodiments of the present invention.

Processor or controller 22 may be enabled with on-board intelligence that is programmable based upon a user input and to control deployment and retraction of leg and wheel assembly 10 based on an operating parameter of the motorcycle 1 such as vehicle speed, and to account for various actions available to the rider while leg and wheel assembly 10 is deployed. For example, processor 22 may be programmable to automatically deploy leg and wheel assembly 10 once the motorcycle 1 is traveling at a speed of less than approximately ten (10) mph but not accelerating, such as when motorcycle 1 is decelerating and approaching a traffic light illuminated red. In this aspect, leg and wheel assembly 10 will automatically deploy so that motorcycle 1 is fully stabilized by leg and wheel assembly 10 as motorcycle 1 slows to a gradual stop.

Processor 22 may be further programmable such that the rider may leave leg and wheel assembly 10 deployed while motorcycle 1 is at rest, or permit the rider to over-ride the programmed functions and balance motorcycle 1 himself by manually activating the retraction of leg and wheel assembly 10. With leg and wheel assembly 10 deployed, the rider can make slow maneuvers (approximately 5 to 10 mph or higher) with motorcycle 1 vertical or the rider can lean motorcycle 1 over as desired so that leg and wheel assembly 10 absorbs the load of and balances motorcycle 1 through a turn such as when motorcycle 1 pulls away from a stopped position and makes a left or right hand turn.

Processor 22 may be configured to track vehicle speed as well as determine whether motorcycle 1 is accelerating, decelerating or standing still. In order to determine if motorcycle 1 is accelerating, decelerating or standing still, processor 22 may be configured to receive an input signal of speed sensor 26 such that processor 22 counts revolutions of rear wheel 6. By counting rear wheel 6 revolutions and comparing that count against a real time count of a clock function of processor 22, processor 22 can determine a speed and a rate of change of speed of motorcycle 1. The speed sensor 26 may function like a switch and processor 22 may be attached to speed sensor 26 via an available interrupt (e.g. int 0) of processor 22. This configuration allows the wheel 6 to require very little processor 22 resources and therefore allow processor 22 to have capability to address other functions.

Processor 22 may be further configured with non-volatile Random Access Memory that allows for storing motorcycle 1 specific data as desired. Such data may include a control program. The control program may be configured to initiate motion of leg and wheel assembly 10 in a particular direction (deployed or retracted) in response to an input until the position sensor of the actuator 40 provides a limit signal to the processor 22 indicating that the desired position has been achieved or for a maximum amount of time (e.g. three (3) seconds), whichever occurs first. Operation of the control program in this manner could prevent operation of actuator 40 any longer than necessary even if a false reading from the position sensor of the actuator 40 is received or circumstances prevent the full travel of leg and wheel assembly 10 as requested by the control program (e.g. an excessive weight load, modified suspension height, etc).

The control program may be user definable via maintenance routines. For example, a maintenance routine may allow for a user to adjust lateral stability system 13 control settings to control the exact position of leg and wheel assembly 10 when retracted and deployed. Each motorcycle 1 is different as far as weight load, suspension height, etc. and the maintenance routine permits flexibility of lateral stability system 13 settings with the processor 22 retaining this information until changed manually. Processor 22 may also be field-upgradeable with a run-time program where the user will be able to download software upgrades and customizations as desired.

Embodiments of the maintenance routines may be accessed by operation of the switches 25. For example, an operator may press and hold both switches for a predetermined period of time (e.g. three (3) seconds or longer) to access the maintenance routines. The user may be informed that the maintenance routines are being accessed by a predetermined flashing code of the indicator lamps 24 (e.g. blinking). Once activated, another press of both switches 25 may initiate a 'Down' or deployed mode adjustment indicated by a flash of the right hand side indicator lamps 24. At this point the user may touch the right hand side switch 25 to lower leg and wheel assembly 10 for as long as the right hand side switch 25 is depressed. Similarly, the left hand side switch 25 may be depressed to raise leg and wheel assembly 10.

When the user is satisfied with the full extension downward or deployment of leg and wheel assembly 10, holding both the right and left hand side switches 25 for a moment may increment the control program to the next maintenance routine such as an 'Up' or un-deployed mode adjustment. Again, each switch 25 may move leg and wheel assembly 10 either up or down until the user is satisfied with the position of leg and wheel assembly 10. Once complete, touching both switches 25 simultaneously may end the maintenance routine mode.

The new settings, once checked for reasonableness of range, are set into the variables for the running program, and written to the memory of the processor 22 to be used until changed again. The program reads these variables in at startup and only changes them if the maintenance routine is run successfully.

Referring to FIG. 4, leg and wheel assembly 10 may be attached to motorcycle 1 and have its movement controlled via a first member 12, which may be an essentially U-shaped structure that rotatably attaches to and is supported by attachment frame 11. First member 12 may rotate about first axis 2 that lies substantially perpendicular to the longitudinal centerline 4, which is the centerline of motorcycle 1. First member 12 may include a pair of rearwardly extending legs 14, 15 arranged at a distance from and substantially parallel to one another. The pair of rearwardly extending legs 14, 15 may form the sides of the essentially U-shaped geometry of first member 12.

The pair of rearwardly extending legs 14, 15 may extend at approximately 90° from the respective ends of first member 12, as best shown in FIG. 4, or they may be configured arcuate or curved as best illustrated in FIGS. 2 and 3. The rearwardly extending legs 14, 15 may be affixed substantially horizontally to respective ends of first member 12 so that legs 14, 15 and the respective ends of first member 12 lie in the same or substantially the same plane. Alternate embodiments allow for legs 14, 15 to be affixed to respective ends of first member 12 at an angle from horizontal so that legs 14, 15 lie in a plane that is offset from a plane formed by the respective ends of first member 12. This offset relationship may be advantageous to accommodate varying motorcycle 1 configurations and/or loading requirements of leg and wheel assembly 10 and other design parameters. Legs 14, 15 may be formed of hollow stock allowing for some deflection of legs 14, 15 when leg and wheel assembly 10 is deployed. This deflection absorbs some load prior to deflection of wheel assembly 30 as described below.

Figure 5:
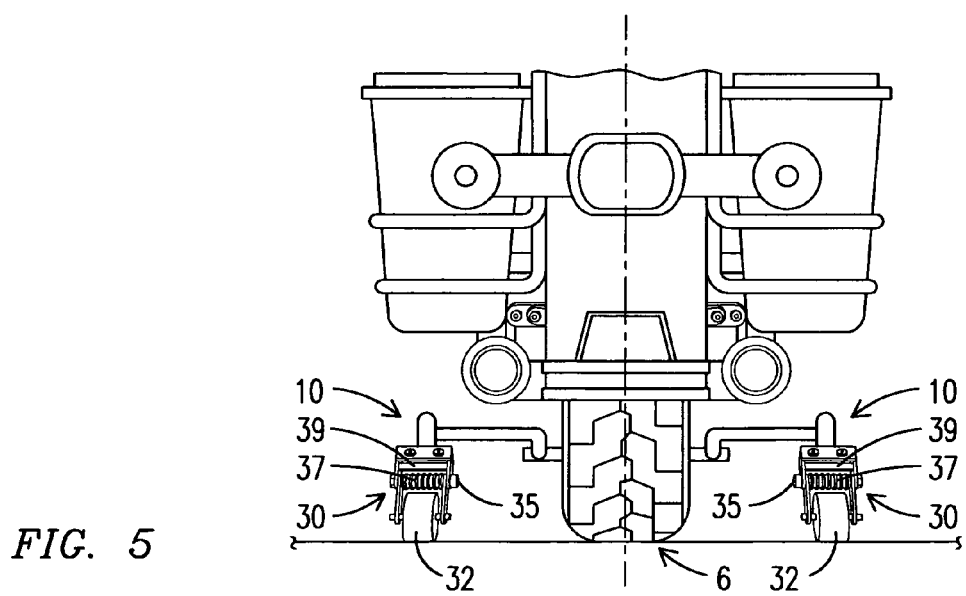
FIG. 5 is a rear view of a motorcycle with the exemplary lateral stability system of FIG. 1 deployed.

A beneficial aspect of embodiments of the invention is that the system does not disturb the aesthetic beauty of the motorcycle and is visually unobtrusive. Therefore, the specific dimensions of first member 12 may be effectively determined by the specific dimensions of the vehicle to which the lateral stability system components will be attached. For example, a narrower or wider motorcycle may accordingly utilize the pair of rearwardly extending legs 14, 15 that are narrower or wider to accommodate the motorcycle dimensions. A span between the pair of rearwardly extending legs 14, 15 may be about 22 inches when mounted to a motorcycle, which allows for both of the rearwardly extending legs 14, 15 and articulated wheel assemblies 30 to be "inboard" or within the outside dimensions or envelope of motorcycle 1 (see FIG. 5). However, other spans are envisioned depending on the vehicle application.

Referring to FIG. 4, an articulated wheel assembly 30 may be arranged at distal ends of each of rearwardly extending legs 14, 15. Each articulated wheel assembly 30 may be configured such that each castor or wheel 32 extends downwardly in a substantially perpendicularly manner from each respective rearwardly extending leg 14, as determined by wheel holder 31. In an embodiment, each wheel holder 31 may be configured to cant each wheel 32 slightly rearwardly to facilitate engagement of wheel 32 with a surface and ensure that wheel holder 31 rotates wheel 32 counterclockwise (as viewed in FIG. 4) about a second axis 3 when assuming a load. In this aspect, slightly rearwardly contemplates wheel holder 31 extending wheel 32 at an angle that is at least a few degrees from perpendicular relative to legs 14, 15. Wheel holder 31 may be attached to a U-shaped bracket 33 via a shaft or bolt 35 to pivot or rotate about second axis 3 thereby permitting rotation of each wheel holder 31. U-shaped brackets 33 may be fixed to the distal ends of legs 14, 15 via welding or other attachment means and extend rearwardly to receive wheel holder 31. Shaft 35 may extend through respective apertures within opposite sides of U-shaped brackets 33 and opposite plates of wheel holder 31.

Articulated wheel assembly 30 may include a wheel cap 34 that may function as an adjustable stop configured to control or limit motion of each respective wheel holder 31 within a respective articulated wheel assembly 30. As shown in FIG. 4, each wheel cap 34 may be formed from a first piece having a substantially right angle and a second piece that is substantially rectangular having two apertures formed therein. It will be appreciated that the shapes and sizes of the pieces forming wheel cap 34 may vary depending on the specific application and wheel cap 34 may be formed as a single piece.

For ease of reference, the terms clockwise and counterclockwise are used with reference to FIG. 4 to indicate direction of movement of articulating wheel assembly 30.

Wheel cap 34 may be bolted and/or welded to one or more opposite plates of U-shaped bracket 33 to limit the clockwise rotation of wheel holder 31 about axis 3. In this aspect, one of the opposite plates of wheel holder 31 may extend forwardly beyond shaft 35 so that an upper or top edge of this plate, which may be substantially flat, engages the underside of the second piece of wheel cap 34. This prevents wheel holder 31 from rotating too far clockwise when leg and wheel assembly 10 are raised, which lifts wheels 32 off the ground or other surface. Without this feature, wheel holder 31 may rotate too far clockwise and wheel 32 would "dangle" in an unfixed position that would not allow proper engagement of wheel 32 with the ground or other surface if leg and wheel assembly 10 were subsequently deployed. This is especially true in view of a spring or torsion system component of wheel assembly 30 when installed, which biases the wheel holder 31 in a clockwise direction.

Articulated wheel assembly 30 may include a biasing means such as a spring 37 for biasing wheel holder 31 to rotate about axis 3 in a clockwise direction and for absorbing a counterclockwise load placed on wheel holder 31 when a wheel 32 engages the ground or other surface. Spring 37 may be a torsion spring that is positioned over shaft 35 and may be configured to provide a stabilizing torque of approximately 135 ft-lbs. Alternate embodiments contemplate springs of varying capacity depending on the specific applications.

Articulated wheel assembly 30 is designed to rotationally deflect in a counterclockwise direction in response to a load placed on a respective wheel 32, which is countered by the stabilizing torque when wheel 32 engages the ground or other surface when in a deployed or lowered position. Each wheel 32 will consequently react against spring 37 within its respective articulated wheel assembly 30 as leg and wheel assembly 10 is lowered and wheels 32 on each side of motorcycle 1 engage the ground.

Articulating wheel assembly 30 may also include a plate 39 affixed between opposite plates of wheel holder 31 as further shown in FIG. 4. Plate 39 may be positioned between opposite plates of wheel holder 31 so that when wheel holder 31 rotates in a counterclockwise direction a portion of plate 39, such as a mid-point of its upper surface, for example, contacts the rearward most edge of the second piece of wheel cap 34. This feature prevents wheel holder 31 from rotating too far in the counterclockwise direction in response to a load being placed on wheel holder 31 when a respective wheel 32 engages the ground or other surface. When plate 39 engages wheel cap 34 the counterclockwise rotation of wheel holder 31 is stopped and the opposite plates of wheel holder 31 and/or portions of U-shaped bracket 33 are prevented from hitting the ground or other surface, which may result in damage caused to the lateral stabilization system 13.

When assembling articulating wheel assembly 30, with wheel cap 34 removed, shaft 35 may be inserted through respective apertures within U-shaped bracket 33 and corresponding apertures with the opposite plates of wheel holder 31. Torsion spring 37 may be placed over shaft 35 prior to insertion of the distal end of shaft 35 through the second set of apertures within U-shaped bracket 33 and wheel holder 31. Spring 37 is positioned so that a first end of spring 37 engages a forward stop or flange (not shown) and a second end engages a rearward stop or flange such as the forward edge of plate 39 thereby positioning spring 37 on shaft 35 so that torsion may be created within spring 37. In an embodiment, the first end of spring 37 may engage a forward stop or flange (not shown) that is beneath wheel cap 34 when wheel cap 34 is in place, such as an appropriately configured stop or flange affixed to the inside surface of U-shaped bracket 33 or the opposite brackets of wheel holder 31. With spring 37 positioned on shaft 35 to create torque, wheel holder 31 may be rotated in a counterclockwise direction so that the upper part of the most forward ends of the opposite plates of wheel holder 31 are beneath the upper edges of U-shaped bracket 33. This counterclockwise rotation creates a "pre-load" on spring 37, which may be approximately one-half of the spring's loading capacity. With wheel holder 31 in this counterclockwise rotated position, wheel cap 34 may be attached to U-shaped bracket 33 thereby limiting the clockwise rotation of the now "pre-loaded" wheel holder 31.

With articulating wheel assembly 30 now assembled and "pre-loaded", it may be advantageous to adjust the position of wheel 32 relative to the ground or other surface, or to the opposite wheel 32 to ensure relatively upright positioning of motorcycle 1 when leg and wheel assembly 10 is deployed. In this aspect, a threaded screw may be inserted within a correspondingly threaded aperture formed within the second piece of wheel cap 34 so that the distal end of the threaded screw engages upon a stop or flange (not shown) affixed to the interior side of one of the opposite plates of wheel holder 31. As shown in FIG. 4, the second piece of wheel cap 34 spans the opposite plates of wheel holder 31 and may have two apertures formed therein. One of these apertures may be threaded to guide a threaded screw onto a stop or flange (not shown) affixed to one of the wheel holder 31 opposite plates immediately beneath this second piece or other appropriate position. As the screw engages this stop or flange wheel holder 31 will be urged in a counterclockwise direction to allow for adjusting the position of wheel 32. This allows for adjusting articulated wheel assembly 30 and consequently leg and wheel assembly 10 to accommodate weight and/or size differences among vehicles and assures that on level ground motorcycle 1 may be set up to be substantially upright rather than leaning to one side or another.

As mentioned above, each articulated wheel assembly 30 may be further configured such that each wheel 32 is canted, either rearwardly or forwardly, to facilitate loading of each articulated wheel assembly 30 during operation. The degree of canting depends on factors such as the weight of the motorcycle 1 and specifications of articulating wheel assembly 30. The degree of canting may be between about 1° to 10° of vertical with leg and wheel assembly 10 in the deployed or lowered position. In an embodiment, lateral stability system 13 may be configured so that leg and wheel assembly 10 is fixed in position, rather than rotatably mounted, so that wheels 32 engage the ground or other surface only when motorcycle 1 is leaned over a certain distance.

The load bearing aspect of leg and wheel assembly 10 allows for the present invention to be very unobtrusive in appearance by having a relatively narrow span between parallel legs of leg and wheel assembly 10. This narrow span in combination with the length and configuration of each leg 14, 15 allows for the sleek and unobtrusive appearance of the lateral stability system when it is deployed or lowered (see FIG. 5). The load bearing capacity of leg and wheel assembly 10, provided primarily torsion spring 37 positioned on shaft 35 and flexing of legs 14, 15, allows for assembly 10 to bear an amount of weight that would otherwise require a much wider span between legs 14, 15 in a device not having this load bearing capacity.

Figure 6:
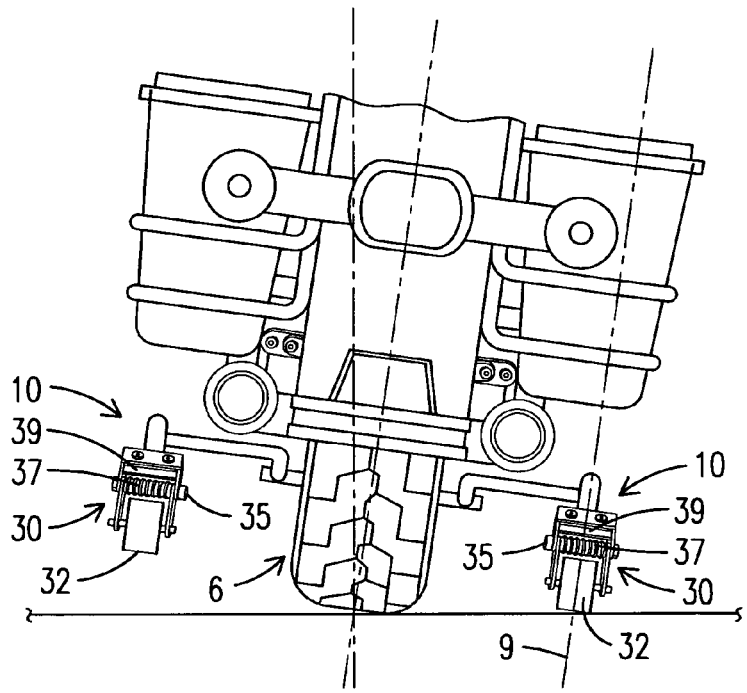
FIG. 6 is a first rear view of the motorcycle of FIG. 5 leaning.

Referring to FIG. 6, an advantage of the load bearing aspect and capacity of leg and wheel assembly 10 is that when motorcycle 1 is at rest, leg and wheel assembly 10 may allow for some motion when leaning the motorcycle's weight left to right. The load placed on leg and wheel assembly 10 in this situation will then help to return the motorcycle 1 to its fully upright position. When stationary, the load bearing capacity of leg wheel assembly 10 in its deployed or lowered position allows for motorcycle 1 to lean up to a permissible amount. A permissible amount of lean is approximately +/−10° for a stationary motorcycle 1 and up to approximately +/−25° from vertical at low speeds of approximately 5 to 10 mph, whereby leg and wheel assembly 10 will support motorcycle 1 and prevent it or significantly restrict it from tipping over. Configurations of the present invention may allow for lesser or greater degrees of leaning depending on user needs, motorcycle design and specifications of leg and wheel assembly 10.

As previously described, torsion spring 37 of articulated wheel assemblies 30 is loaded by the motorcycle's weight when leg and wheel assembly 10 is deployed and one or more wheel 32 is engaging the ground or other surface. This loading, which may be in conjunction with some flexing of legs 14, 15 creates a nearly normal riding sensation.

As described above, an advantage of the load bearing function of leg and wheel assembly 10 is to allow a degree of motorcycle lean angle during operation while a wheel 32 is in contact with the ground. Therefore, the operator of motorcycle 1 may make a turn before leg and wheel assembly 10 is retracted either manually by the user with the input/display device 21 or automatically by the lateral stability system 13. This is because the inside wheel 32 of leg and wheel assembly 10 during a lean, which is absorbing the load, will extend almost parallel to the ground when motorcycle 1 is leaned and will return to the at rest position when motorcycle 1 is brought back to the upright position. In this aspect, the rotational pivot of spring-loaded wheel holder 31 about axis 3 allows wheel 32 to extend rearwardly in response to motorcycle 1 being leaned into a turn. This wheel articulation/load bearing component allows a rider to control motorcycle 1 as it would normally be controlled without the lateral stability system 13, particularly when leaning motorcycle 1 into a turn. Rather than artificially forcing a mostly upright position such as with rigid wheels not having an articulation/load bearing component, embodiments of the invention all the rider to lean into turns at slow speed while leg and wheel assembly 10 is lowered or deployed and return motorcycle 1 to upright after the turn at which time leg and wheel assembly 10 may automatically retract into its upright position. A beneficial aspect of this feature is that the lateral stability system 13 operation is virtually transparent to the rider.

Figure 7:
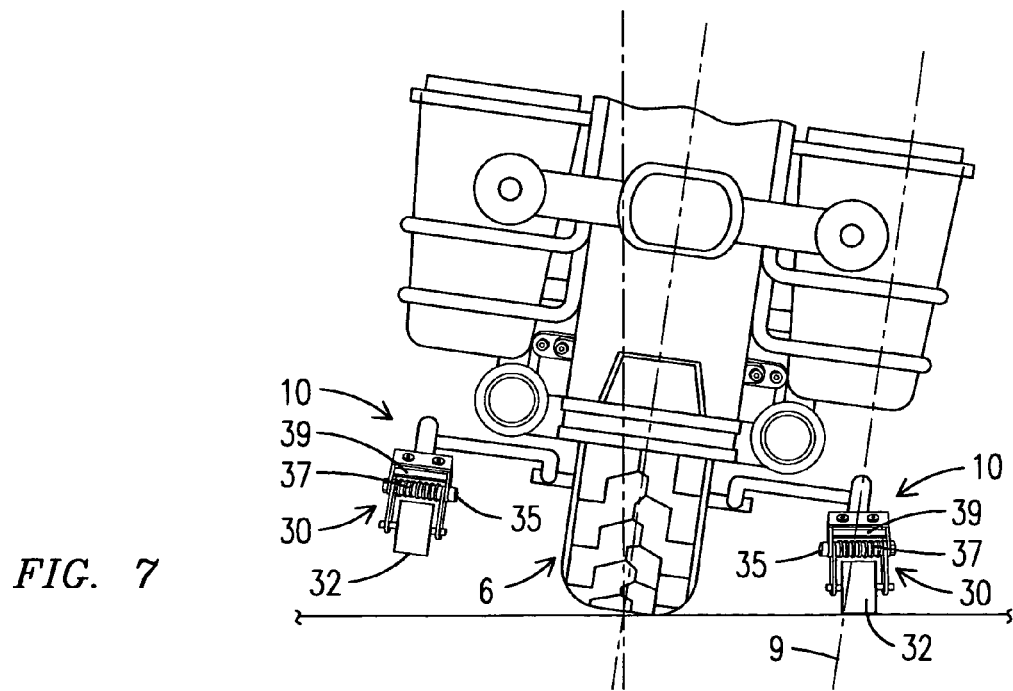
FIG. 7 is a second rear view of the motorcycle of FIG. 5 leaning.

Alternate embodiments of the invention allow for articulated wheel assembly 30 to articulate about axis 3 as described and further about an axis 8 that extends substantially perpendicular to axis 3 thereby allowing for 2-degrees of rotational freedom for articulated wheel assembly 30 (see FIG. 4). This may allow for the entire width of wheel 32 to remain in full contact with the ground during a lean of substantial degree which improves stability of motorcycle 1 as shown in FIG. 7. Articulating wheel assembly 30 may be connected with each leg 14, 15 via means that allow for assembly 30 to rotate about axis 8 simultaneously while rotating about axis 3. Various means may be used for this connection as recognized by those skilled in the art such as appropriately configured bearings and stops to prevent over rotation of assembly 30 about axis 8.

FIG. 6 shows an embodiment of the invention without the additional rotational degree of freedom about axis 8. In this configuration, the vertical axis 9 of the wheel assembly 30 remains parallel to the vertical centerline of the motorcycle. In other words, if the motorcycle 1 leans by an angle, the wheel assembly 30 will lean by the same amount and only a portion of wheel 32 will make contact with the ground depending at least in part on the width of wheel 32 and degree of lean.

In contrast, FIG. 7 shows an embodiment of the invention with the additional rotational degree of freedom about axis 8. In this configuration, the vertical axis 9 of the articulating wheel assembly 30 remains perpendicular to the surface of the ground and is not restricted to be parallel to the vertical centerline of the motorcycle 1. In other words, if the motorcycle 1 leans by an angle, the wheel assembly 30 in contact with the ground is not forced to lean by the same amount and therefore the full width of wheel 32 will make contact with the ground.

One advantage of the lateral stability system 13 is that riders who have difficulty balancing large touring motorcycles may experience safety and convenience never before realized. The present invention does not compromise the handling, lean angle or appearance of motorcycle 1 whether the lateral stability system 13 is deployed or retracted. The lateral stability system 13 is configured to fit within a width envelope of motorcycle 1 and therefore does not extend beyond the width of the motorcycle 1. The lateral stability system 13 allow for the full robust sensation of riding a motorcycle 1 without the compromise of previous stabilization systems.

While embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A lateral stabilization system for a vehicle, the lateral stabilization system comprising:
   a frame attachable to the vehicle;
   a pair of substantially parallel legs extending rearwardly of a forward end of the vehicle from the frame;
   an articulating wheel assembly attached to a distal end of each of the pair of substantially parallel legs, wherein the pair of substantially parallel legs are configured to flex in combination with the articulating wheel assembly to allow the vehicle to lean laterally up to a permissible amount from vertical without tipping over; and
   a position control device for controlling movement of the substantially parallel legs in response to at least one operating parameter of the vehicle.

2. The lateral stabilization system of claim 1 further comprising the pair of substantially parallel legs rotatably attached to the frame to rotate about a first axis arranged substantially perpendicular to a longitudinal axis of the vehicle.

3. The lateral stabilization system of claim 2, the articulating wheel assembly comprising a wheel holder supporting a wheel, the wheel holder rotatable about a second axis substantially parallel to and spaced from the first axis.

4. The lateral stabilization system of claim 3, the articulating wheel assembly further comprising a shaft on which the wheel holder is rotatably mounted and a torsion spring over the shaft for biasing the wheel holder to rotate in a first direction.

5. The lateral stabilization system of claim 4, the articulating wheel assembly further comprising a wheel cap positioned in relation to the wheel holder to limit rotation of the wheel holder in the first direction.

6. The lateral stabilization system of claim 4, the articulating wheel assembly further comprising a wheel cap and a plate affixed to the wheel holder, the wheel cap and the plate positioned in relation to each other to limit rotation of the wheel holder in a second direction.

7. The lateral stabilization system of claim 3 further comprising the articulating wheel assembly rotatably mounted to the distal end each of the pair of substantially parallel legs to rotate about a third axis arranged substantially parallel to the longitudinal axis of the vehicle and substantially perpendicular to the first axis and the second axis.

8. The lateral stabilization system of claim 1, the position control device comprising a processor, an actuator and a speed sensor, the processor programmed to control a position of the pair of substantially parallel legs based on a speed of a wheel of the vehicle.

9. The stabilization system of claim 1, the articulating wheel assembly further comprising:
   a bracket connected with the distal end;
   a shaft positioned within the bracket;
   a torsion spring positioned over the shaft;
   a wheel holder rotatably mounted to the shaft and supporting a wheel, the torsion spring positioned on the shaft to bias the wheel holder to rotate in a first direction;
   a wheel cap connected to the bracket and positioned with respect to the wheel holder to limit rotation of the wheel holder in the first direction; and
   a plate affixed to the wheel holder, the plate positioned in relation to the wheel cap to limit rotation of the wheel holder in a second direction when the articulating wheel assembly is absorbing a load in response to the wheel engaging a surface, the second direction being the opposite of the first direction.

10. The lateral stabilization system of claim 9 further comprising the pair of substantially parallel legs rotatably attached to the frame to rotate about a first axis arranged substantially perpendicular to a longitudinal axis of the vehicle.

11. The lateral stabilization system of claim 10 further comprising the position control device programmed to move the pair of substantially parallel legs from a first to a second position based on a speed of the vehicle and whether the vehicle is accelerating.

12. A motorcycle comprising:
a frame;
a front wheel assembly and a rear wheel assembly secured to the frame;
an internal combustion engine for powering the motorcycle;
a pair of substantially parallel legs extending rearwardly of a forward end of the motorcycle from the frame;
an articulating wheel assembly attached to a distal end of each of the pair of substantially parallel legs;
a position control device for controlling movement of the substantially parallel legs between a retracted position and a deployed position in response to at least one operating parameter of the motorcycle; the articulating wheel assembly comprising:
a wheel holder supporting a wheel;
means for biasing the wheel holder to rotate about a first axis so that the wheel is urged in a first direction;
a wheel cap positioned relative to the wheel holder to limit rotation of the wheel holder in the first direction; and
a plate affixed to the wheel holder that engages the wheel cap when the wheel is urged in a second direction in response to the articulating wheel assembly absorbing a load when the wheel engages a surface, the wheel cap and the plate operating to limit rotation of the wheel holder in the second direction.

13. The motorcycle of claim 12, the position control device comprising a processor in communication with a linear actuator affixed to the frame, the processor programmed to instruct the actuator to move the substantially parallel legs from the retracted position to the deployed position when the motorcycle's speed is approximately 10 mph or less and the motorcycle is not accelerating.

14. The motorcycle of claim 12, the means for biasing the wheel holder comprising a torsion spring positioned between the wheel cap and the wheel holder.

15. A motorcycle comprising:
a frame;
a front wheel assembly and a rear wheel assembly secured to the frame;
an internal combustion engine for powering the motorcycle;
a pair of substantially parallel legs extending rearwardly of a forward end of the motorcycle from the frame;
an articulating wheel assembly attached to a distal end of each of the pair of substantially parallel legs;
a position control device for controlling movement of the substantially parallel legs between a retracted position and a deployed position in response to at least one operating parameter of the motorcycle; the articulating wheel assembly comprising:
a wheel holder supporting a wheel, the wheel holder rotatably mounted about a first axis to the distal end;
a torsion spring in mechanical communication with the wheel holder to bias the wheel holder to rotate in a first direction about the first axis;
a first mechanical stop limiting rotation of the wheel holder in the first direction; and
a second mechanical stop limiting rotation of the wheel holder in a second direction when the wheel is urged in the second direction in response to engaging a surface and absorbing a load.

16. An apparatus for use in stabilizing a vehicle, comprising:
an attachment frame that may be affixed to the vehicle;
a leg and wheel assembly connected with the attachment frame, the leg and wheel assembly having a first distal end and a second distal end;
a pair of articulating wheel assemblies movably connected to a respective one of the first distal end and the second distal end of the leg and wheel assembly; and each of the pair of articulating wheel assemblies comprising:
a wheel holder supporting a wheel;
means for biasing the wheel holder to rotate about a first axis so that the wheel is urged in a first direction;
a wheel cap positioned relative to the wheel holder to limit rotation of the wheel holder in the first direction; and
a plate affixed to the wheel holder that engages the wheel cap when the wheel is urged in a second direction in response to the articulating wheel assembly absorbing a load when the wheel engages a surface, the wheel cap and the plate operating to limit rotation of the wheel holder in the second direction.

17. The apparatus of claim 16 further comprising:
a processor programmed to control a position of the leg and wheel assembly based on an operating parameter of the vehicle;
a user input/display device for controlling the processor; and
an actuator for moving the leg and wheel assembly between a retracted position and a deployed position in response to commands from the processor.

* * * * *